(12) United States Patent
Wu

(10) Patent No.: US 9,191,938 B2
(45) Date of Patent: Nov. 17, 2015

(54) METHOD OF HANDLING CONTROL CHANNEL AND RELATED COMMUNICATION DEVICE

(71) Applicant: HTC Corporation, Taoyuan County (TW)

(72) Inventor: Chih-Yao Wu, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 58 days.

(21) Appl. No.: 13/787,841

(22) Filed: Mar. 7, 2013

(65) Prior Publication Data

US 2013/0235817 A1    Sep. 12, 2013

Related U.S. Application Data

(60) Provisional application No. 61/608,643, filed on Mar. 9, 2012, provisional application No. 61/720,401, filed on Oct. 31, 2012.

(51) Int. Cl.
*H04W 72/04* (2009.01)
*H04L 5/00* (2006.01)
*H04W 28/06* (2009.01)
*H04W 48/16* (2009.01)

(52) U.S. Cl.
CPC ........... *H04W 72/042* (2013.01); *H04L 5/0094* (2013.01); *H04L 5/0048* (2013.01); *H04L 5/0053* (2013.01); *H04W 28/06* (2013.01); *H04W 48/16* (2013.01); *H04W 72/04* (2013.01)

(58) Field of Classification Search
CPC ......... H04W 24/10; H04W 72/04; H04J 1/00; H04L 5/0094
USPC ........................................................ 370/329
See application file for complete search history.

(56) References Cited

U.S. PATENT DOCUMENTS

| 2011/0170496 | A1  | 7/2011 | Fong et al. | |
| 2012/0178360 | A1* | 7/2012 | Park et al. | 455/7 |
| 2013/0064099 | A1* | 3/2013 | Kim et al. | 370/241 |
| 2013/0188566 | A1* | 7/2013 | Zhu et al. | 370/329 |

(Continued)

FOREIGN PATENT DOCUMENTS

| CN | 101820669 A | 9/2010 |
| CN | 102265677 A | 11/2011 |

(Continued)

OTHER PUBLICATIONS

European patent application No. 13001162.0, European application filing date: Mar. 8, 2013, European Search Report mailing date: Sep. 10, 2013.

(Continued)

*Primary Examiner* — Edan Orgad
*Assistant Examiner* — Emmanuel Maglo
(74) *Attorney, Agent, or Firm* — Winston Hsu; Scott Margo

(57) ABSTRACT

A method of detecting a control channel is disclosed. The method comprises determining a number of a plurality of resource units assigned for the control channel according to a size indicator; determining the plurality of resource units according to a combinatorial index, wherein the combinatorial index is determined according to the number of the plurality of resource units and a number of total resource units; and detecting the control channel according to the plurality of resource units.

10 Claims, 7 Drawing Sheets

(56) References Cited

U.S. PATENT DOCUMENTS

2013/0195067 A1* 8/2013 Khoshnevis et al. ......... 370/330
2014/0036800 A1* 2/2014 Frenne et al. ................ 370/329

FOREIGN PATENT DOCUMENTS

| WO | 2010053984 A2 | 5/2010 |
|---|---|---|
| WO | 2010053984 A3 | 5/2010 |
| WO | WO 2010053984 A3 * | 8/2010 |
| WO | WO 2011078582 A2 * | 6/2011 |
| WO | WO 2012108928 A1 * | 8/2012 |

OTHER PUBLICATIONS

ETSI TS 136 211 V10.4.0 (Jan. 2012), "LTE; Evolved Universal Terrestrial Radio Access (E-UTRA); Physical channels and modulation (3GPP TS 36.211 version 10.4.0 Release 10)", XP014069597, cover page+ p. 1-102.

New Postcom, "The VU-ePDCCH design framework", 3GPP TSG RAN WG1 #67, R1-113691, Nov. 14-18, 2011, San Francisco, USA, XP050561824, pp. 1-9.

European patent application No. 13001162.0, European Search Report mailing date: Jun. 11, 2013.

3GPP TS 36.213 V10.5.0 (Mar. 2012), "3rd Generation Partnership Project; Technical Specification Group Radio Access Network; Evolved Universal Terrestrial Radio Access (E-UTRA); Physical layer procedures (Release 10)", XP050579996, p. 1-125.

HTC, "PRB pair Configuration for EPDCCH Sets", 3GPP TSG RAN WG1 Meeting#71, R1-124958, Nov. 12-16, 2012, New Orleans, USA, XP050662877, p. 1-5.

NTT DOCOMO, HTC, Huawei, "PRC Indication for EPDCCH", h3GPP TSG RAN WG1 Meeting#71, R1-125335, Nov. 12-16, 2012, New Orleans, USA, XP050663174, p. 1.

Huawei, HiSilicon, "Resource allocation for EPDCCH sets", 3GPP TSG RAN WG1 Meeting#71, R1-125151, Nov. 12-16, 2012, New Orleans, USA, XP050663008, p. 1-4.

3GPP TS 36.213 V10.6.0 (Jun. 2012) Technical Specification 3rd Generation Partnership Project; Technical Specification Group Radio Access Network; Evolved Universal Terrestrial Radio Access (E-UTRA); Physical layer procedures (Release 10).

3GPP TS 36.211 V10.4.0 (Dec. 2011) Technical Specification 3rd Generation Partnership Project; Technical Specification Group Radio Access Network; Evolved Universal Terrestrial Radio Access (E-UTRA); Physical Channels and Modulation (Release 10).

3GPP TS 36.212 V10.4.0 (Dec. 2011) Technical Specification 3rd Generation Partnership Project; Technical Specification Group Radio Access Network; Evolved Universal Terrestrial Radio Access (E-UTRA); Multiplexing and channel coding (Release 10).

3GPP TSG RAN WG1 Meeting #68 R1-120581 Dresden, Germany, Feb. 6-10, 2012 Source: China Telecom Title:On Search Space of ePDCCH Agenda item:7.6.3. Document for: Discussion and decision.

Office action mailed on Jul. 3, 2015 for the China application No. 201310076810.0, filed Mar. 11, 2013.

\* cited by examiner

METHOD OF HANDLING CONTROL CHANNEL AND RELATED COMMUNICATION DEVICE

CROSS REFERENCE TO RELATED APPLICATIONS

This application claims both the benefit of U.S. Provisional Application No. 61/608,643, filed on Mar. 9, 2012, entitled "Method and Apparatus for Resource Detection of Enhanced Control Channel for OFDMA Systems", and the benefit of U.S. Provisional Application No. 61/720,401, filed on Oct. 31, 2012, entitled "Method and Apparatus for Resource Indication Signaling Compression of Enhanced Downlink Control Channel for OFDMA Systems", the contents of which are incorporated herein in their entirety.

BACKGROUND OF THE INVENTION

1. Field of the Invention

The present invention relates to a method used in a wireless communication system and related communication device, and more particularly, to a method of handling a control channel and related communication device.

2. Description of the Prior Art

A long-term evolution (LTE) system supporting the 3GPP Rel-8 standard and/or the 3GPP Rel-9 standard are developed by the 3rd Generation Partnership Project (3GPP) as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple UEs, and communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (CoMP), UL multiple-input multiple-output (MIMO), etc. For a UE and an eNB to communicate with each other in the LTE-A system, the UE and the eNB must support standards developed for the LTE-A system, such as the 3GPP Rel-10 standard or later versions.

Thus, a large amount of control information is needed to realize the abovementioned systems. Accordingly, advanced control channels are introduced for transmitting the control information, e.g., enhanced physical control format indicator channel (EPCFICH), enhanced physical downlink control channel (EPDCCH). Different from a legacy physical downlink control channel (PDCCH) which can only be transmitted in first few orthogonal frequency domain multiplexing (OFDM) symbols of a subframe, the advanced control channels can be transmitted in more symbols to achieve flexibility and robustness. As a result, the eNB needs to indicate (i.e., configure) the advanced control channels to the UE by using a larger amount of signaling. Thus, how to indicate the advanced control channels efficiently is an important topic to be discussed. That is, the eNB indicate the EPDCCH to the UE by using a signaling with low overhead, while the UE can still detect (e.g., locate, detect) and recover the EPDCCH correctly according to the signaling.

SUMMARY OF THE INVENTION

The present invention therefore provides a method and related communication device for handling a control channel to solve the abovementioned problem.

A method of detecting a control channel is disclosed. The method comprises determining a number of a plurality of resource units assigned for the control channel according to a size indicator; determining the plurality of resource units according to a combinatorial index, wherein the combinatorial index is determined according to the number of the plurality of resource units and a number of total resource units; and detecting the control channel according to the plurality of resource units.

A method of indicating a control channel is disclosed. The method comprises determining a size indicator according to a number of a plurality of resource units assigned for the control channel; determining a combinatorial index according to the number of the plurality of resource units and a number of total resource units; and indicating the control channel according to the size indicator and the combinatorial index.

A method of detecting a control channel for a communication device in a wireless communication system is disclosed. The method comprises determining a starting position of the control channel according to a starting index; and receiving size information of the control channel in a control format indicator channel transmitted by a network of the wireless communication system.

A method of indicating a control channel for a network of a wireless communication system is disclosed. The method comprises determining size information of the control channel; transmitting a control format indicator channel comprising the size information to a communication device in the wireless communication system, to indicate the control channel to the communication device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
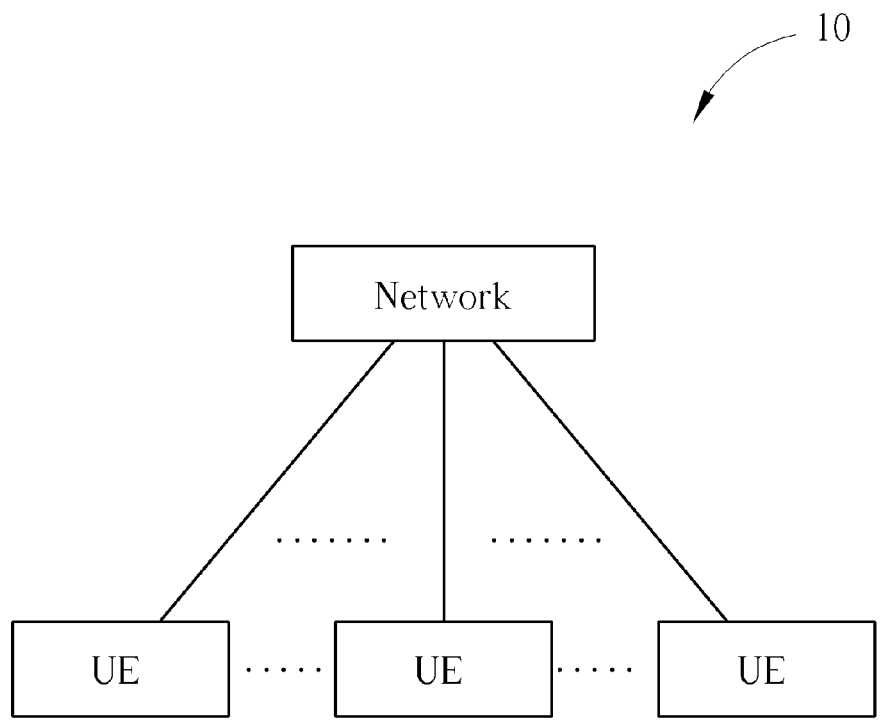
FIG. 1 is a schematic diagram of a wireless communication system according to an example the present invention.

Please refer to FIG. 1, which is a schematic diagram of a wireless communication system 10 according to an example of the present invention. The wireless communication system 10 is briefly composed of a network and a plurality of user equipments (UEs). In FIG. 1, the network and the UEs are simply utilized for illustrating the structure of the wireless communication system 10. Practically, the network can be a universal terrestrial radio access network (UTRAN) comprising a plurality of Node-Bs (NBs) in a universal mobile telecommunications system (UMTS). Alternatively, the network can be an evolved UTRAN (E-UTRAN) comprising a plurality of evolved NBs (eNBs) and/or relays in along term evolution (LTE) system or a LTE-Advanced (LTE-A) system.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a UE, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. Besides, the information can be processed by both the UTRAN/E-UTRAN and the core network, and the decisions are made after coordination and/or cooperation are performed by the UTRAN/E-UTRAN and the core network. a UE can be a mobile phone, a laptop, a tablet computer, an electronic book or a portable computer system. Besides, the network and the UE can be seen as a transmitter or a receiver according to transmission direction, e.g., for an uplink (UL), the UE is the transmitter and the network is the receiver, and for a downlink (DL), the network is the transmitter and the UE is the receiver.

Figure 2:
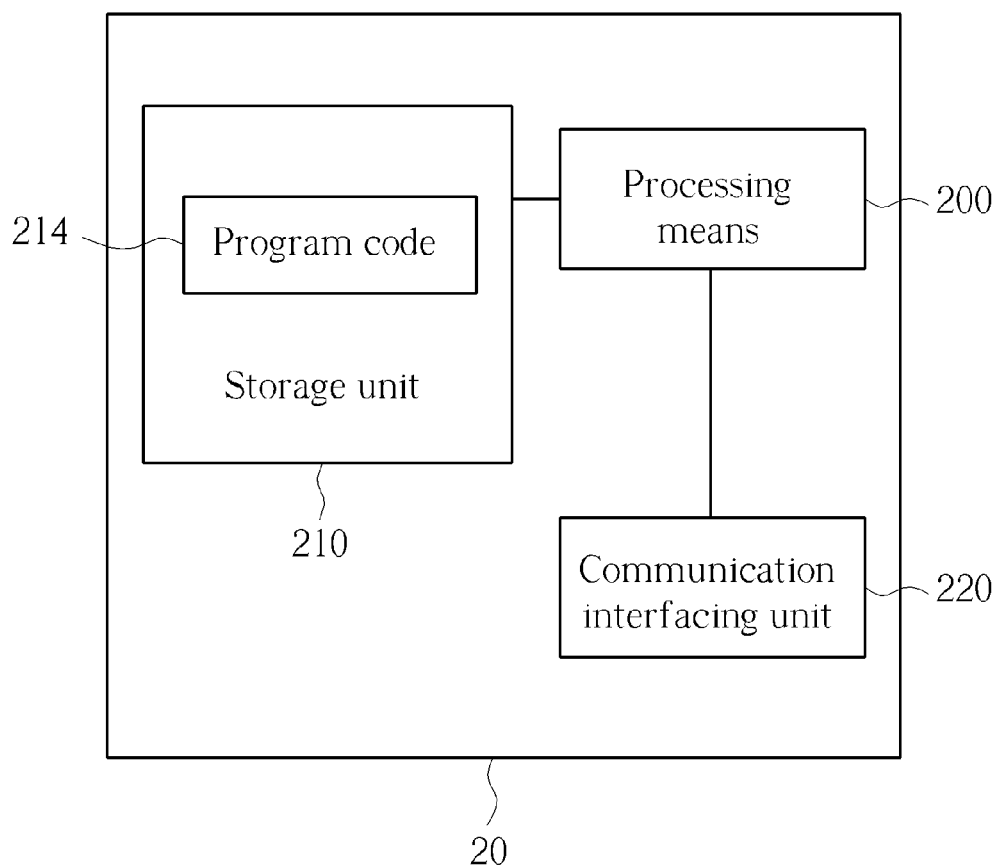
FIG. 2 is a schematic diagram of a communication device according to an example to the present invention.

Please refer to FIG. 2, which is a schematic diagram of a communication device 20 according to an example of the present invention. The communication device 20 can be a UE or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store a program code 214, accessed and executed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 220 is preferably a transceiver and is used to transmit and receive signals (e.g., messages or packets) according to processing results of the processing means 200.

Figure 3:
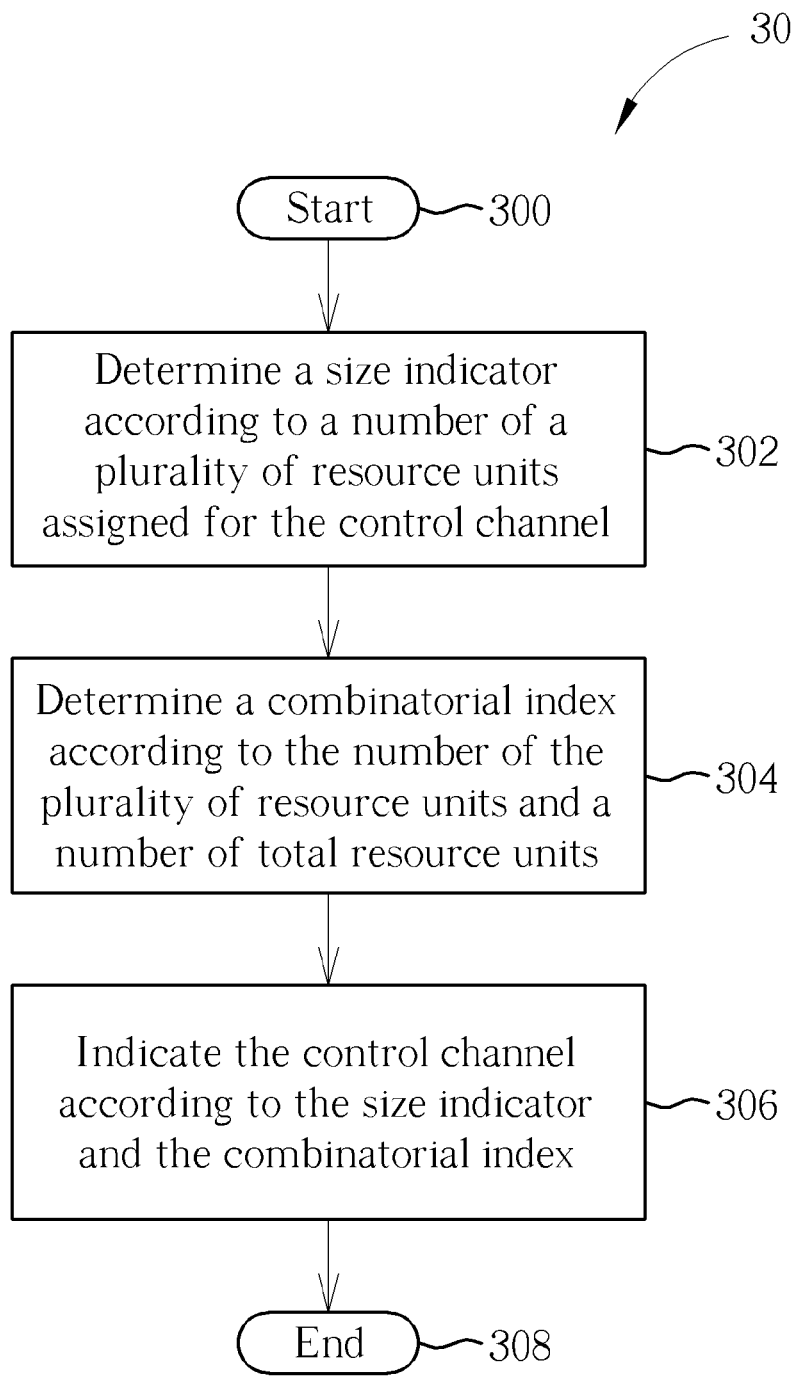
FIG. 3 is a flowchart of a process according to an example of the present invention.

Please refer to FIG. 3, which is a flowchart of a process 30 according to an example of the present invention. The process 30 can be utilized in the network shown in FIG. 1, for indicating (e.g., assigning, configuring) a control channel. The process 30 may be compiled into the program code 214 and includes the following steps:

Step 300: Start.

Step 302: Determine a size indicator according to a number of a plurality of resource units assigned for the control channel.

Step 304: Determine a combinatorial index according to the number of the plurality of resource units and a number of total resource units.

Step 306: Indicate the control channel according to the size indicator and the combinatorial index.

Step 308: End.

According to the process 30, the network determines a size indicator according to a number of a plurality of resource units assigned for the control channel, and determines a combinatorial index according to the number of the plurality of resource units and a number of total resource units. Then, network can indicate the control channel according to the size indicator and the combinatorial index. In other words, the network can assign the control channel to the UE by using the size indicator and the combinatorial index, e.g., transmitting the size indicator and the combinatorial index to the UE.

Figure 4:
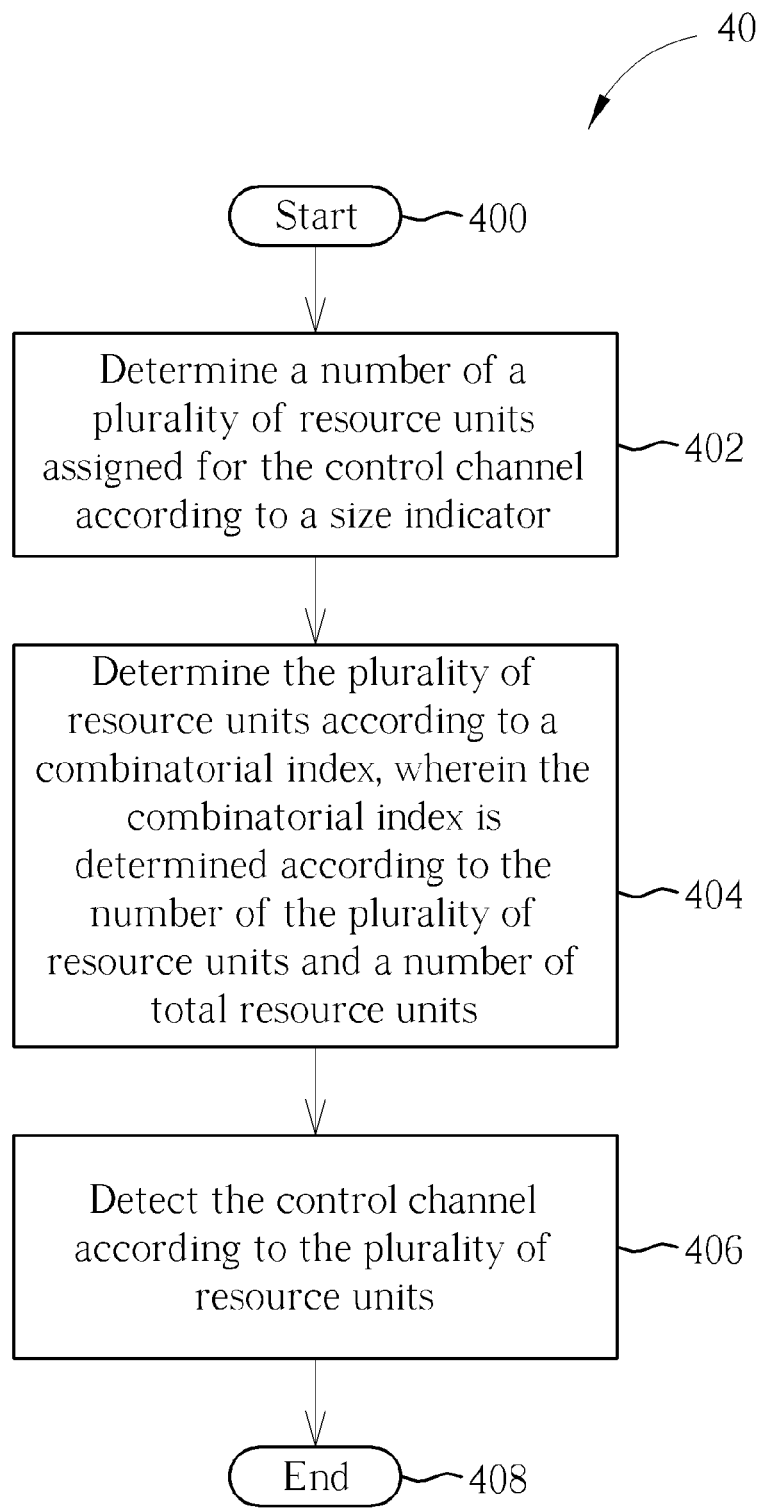
FIG. 4 is a flowchart of a process according to an example of the present invention.

Correspondingly, a UE can detect (e.g., locate, demodulate and/or decode) the control channel by using the size indicator and the combinatorial index. Please refer to FIG. 4, which is a flowchart of a process 40 according to an example of the present invention. The process 40 is utilized in a UE shown in FIG. 1, for detecting a control channel. The process 40 may be compiled into the program code 214 and includes the following steps:

Step 400: Start.

Step 402: Determine a number of a plurality of resource units assigned for the control channel according to a size indicator.

Step 404: Determine the plurality of resource units according to a combinatorial index, wherein the combinatorial index is determined according to the number of the plurality of resource units and a number of total resource units.

Step 406: Detect the control channel according to the plurality of resource units.

Step 408: End.

According to the process 40, the UE first determines a number of a plurality of resource units assigned for the control channel according to a size indicator. Then, the UE determines the plurality of resource units according to a combinatorial index, wherein the combinatorial index is determined according to the number of the plurality of resource units and a number of total resource units. Thus, the UE can detect the control channel according to the plurality of resource units. In other words, the UE can detect the control channel to the UE by using the size indicator and the combinatorial index, e.g., after receiving the size indicator and the combinatorial index to the UE.

Thus, the network can assign the control channel to the UE by using a signaling with low overhead, while the UE can detect (e.g., locate, detect) and recover the control channel correctly according to the signaling.

Please note that, a method according to which the size indicator and the combinatorial index are obtained or used is not limited, as long as the plurality of resource units one-to-one correspond to (a combination of) the size indicator and the combinatorial index. That is, the plurality of resource units can be uniquely determined according to the size indicator and the combinatorial index. Conversely, the size indicator and the combinatorial index can also be uniquely determined according to the plurality of resource units. For example, the combinatorial index can be determined according to the following equation:

$$c_m = \sum_{i=0}^{m-1} \binom{N - r_i}{m - i}, \quad \text{(Eq. 1)}$$

where m is the number of the plurality of resource units, $r_i$ is an index of an ith resource unit of the plurality of resource units with $1 \leq r_i \leq N$ and $r_i < r_{i+1}$, N is the number of the total resource units, and $$\begin{pmatrix} x \\ y \end{pmatrix} = \begin{cases} \begin{pmatrix} x \\ y \end{pmatrix}, & x \geq y \\ 0 & x < y \end{cases} \text{ with } \begin{pmatrix} x \\ y \end{pmatrix} = \frac{x!}{y!(x-y)!}.$$

Besides, the plurality of resource units and the total resource units mentioned above can be resource blocks (RBs) or resource block groups (REGs). Further, a length of the combinatorial index can be predetermined as $$\left\lceil \log_2 \begin{pmatrix} N \\ M \end{pmatrix} \right\rceil,$$

where M is a maximum number of resource units supported, and $\lceil \cdot \rceil$ is a ceiling function. That is, a maximum number of bits needed for representing the combinatorial index is $$\left\lceil \log_2 \begin{pmatrix} N \\ M \end{pmatrix} \right\rceil.$$

Thus, additional overhead can be avoided, if space (e.g., of the storage unit) of $$\left\lceil \log_2 \begin{pmatrix} N \\ M \end{pmatrix} \right\rceil$$

bits are reserved for storing the combinatorial index.

When the wireless communication system 10 conforms to the 3GPP Rel-11 standard or later versions, the control channel can be an enhanced physical downlink control channel (EPDCCH) wherein the plurality of resource units compose an EPDCCH set. For example, the number of total resource units is 15, and the network intends to assign the EPDCCH set including four RBs RB2, RB7, RB10 and RB11 to the UE. The size indicator denotes a number of physical resource blocks actually assigned for an EPDCCH set. One example is to let the size indicator be represented by 2 bits, e.g., "00" for 2 RBs, "01" for 4 RBs and "10" for 8 RBs, where "11" is reserved. Then, the combinatorial index can be obtained according to Eq.1 as follows $$c_4 = \begin{pmatrix} 13 \\ 4 \end{pmatrix} + \begin{pmatrix} 8 \\ 3 \end{pmatrix} + \begin{pmatrix} 5 \\ 2 \end{pmatrix} + \begin{pmatrix} 4 \\ 1 \end{pmatrix} = 785$$

in a decimal format, and $c_4$ can be represented in a binary format as "0001100010001". Thus, the RBs RB2, RB7, RB10 and RB11 can be uniquely be indicated (e.g., assigned, configured) by using a combination of the size indicator and the combinatorial index, which is "010001100010001". Note that a method according to which the combination is performed is not limited, as long as one-to-one correspondence between the EPDCCH set and the size indicator and the combinatorial index is not violated. Besides, the length of the combinatorial index in the present example is $$\left\lceil \log_2 \begin{pmatrix} 15 \\ 8 \end{pmatrix} \right\rceil$$

due to M=8. Correspondingly, the UE can detect (e.g., locate, demodulate and/or decode) the EPDCCH by using the size indicator and the combinatorial index. That is, the one-to-one correspondence between the EPDCCH and the size indicator and the combinatorial index is used for detecting the control channel.

Thus, according to the process 30, the process 40 and the abovementioned description, the network can assign the control channel to the UE by using a signaling with low overhead, while the UE can detect and recover the control channel correctly according to the signaling.

Figure 5:
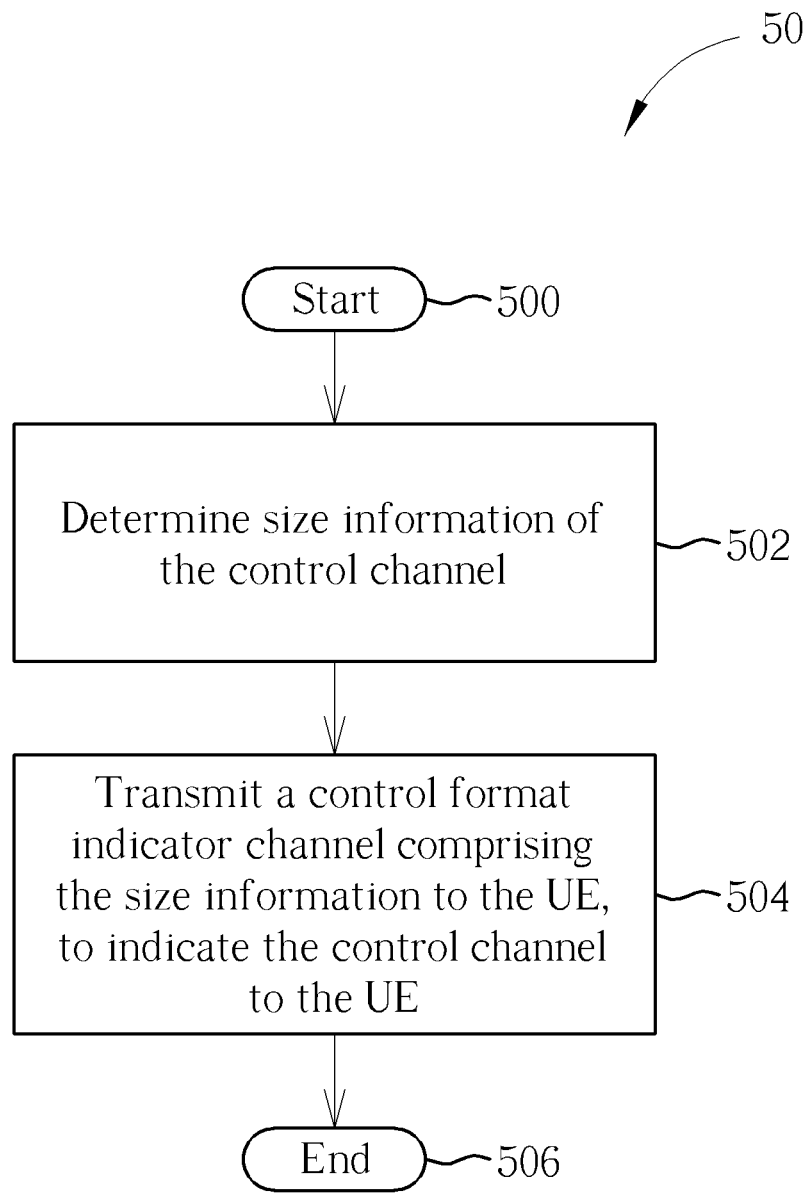
FIG. 5 is a flowchart of a process according to an example of the present invention.

Please refer to FIG. 5, which is a flowchart of a process 50 according to an example of the present invention. The process 50 is utilized in the network shown in FIG. 1, for indicating (e.g., assigning, configuring) a control channel to a UE. The process 50 may be compiled into the program code 214 and includes the following steps:

Step 500: Start.
Step 502: Determine size information of the control channel.
Step 504: Transmit a control format indicator channel comprising the size information to the UE, to indicate the control channel to the UE.
Step 506: End.

According to the process 50, the network determines size information of the control channel, and transmits a control format indicator channel comprising the size information to the UE to indicate the control channel to the UE.

Figure 6:
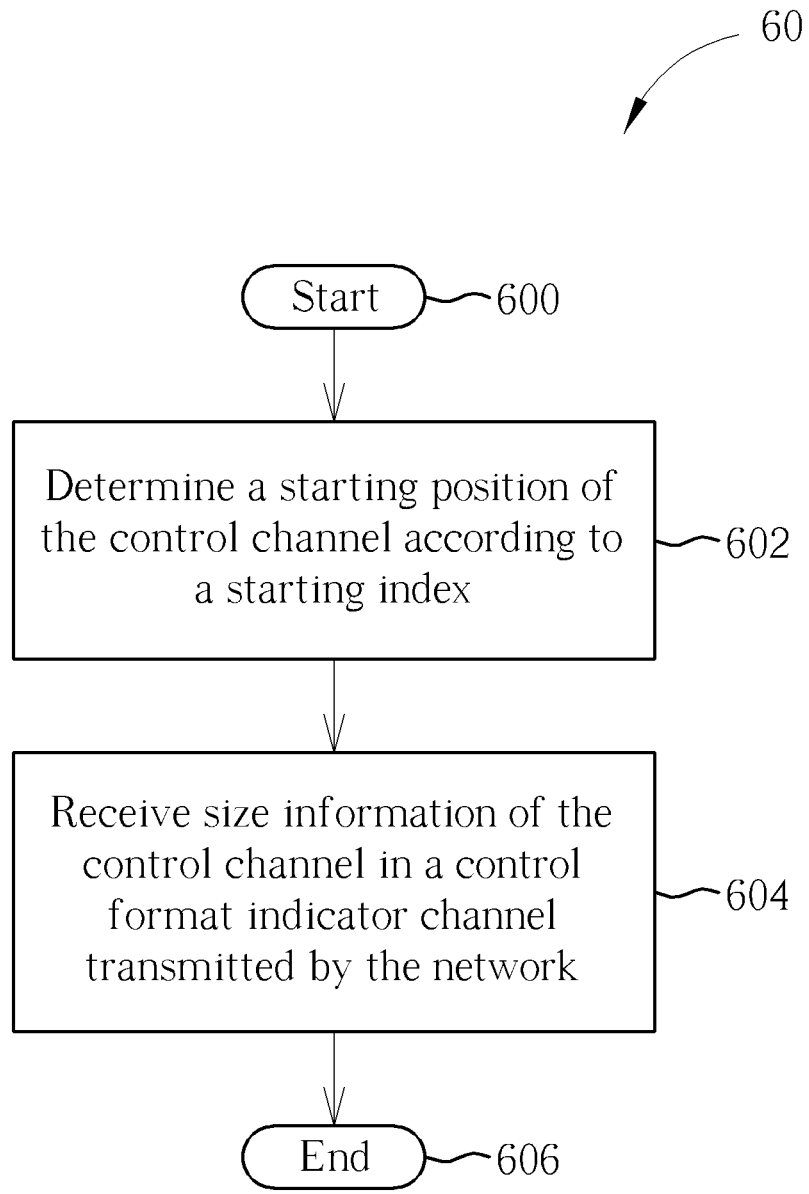
FIG. 6 is a flowchart of a process according to an example of the present invention.

Corresponding, please refer to FIG. 6, which is a flowchart of a process 60 according to an example of the present invention. The process 60 is utilized in the UE shown in FIG. 1, for detecting (e.g., locating, demodulating and/or decoding) a control channel (e.g., the control channel in the process 50). The process 60 may be compiled into the program code 214 and includes the following steps:

Step 600: Start.
Step 602: Determine a starting position of the control channel according to a starting index.
Step 604: Receive size information of the control channel in a control format indicator channel transmitted by the network.
Step 606: End.

According to the process 60, the UE determines a starting position of the control channel according to a starting index, and receives size information of the control channel in a control format indicator channel transmitted by the network. Then, the UE can detect the control channel according to the starting position and the size information.

Thus, the starting position is determined semi-statically for realizing frequency-domain inter-cell interference control (FDM-ICIC), while the size information is configured rapidly to adapt to fast varying environments (e.g., a number of the UEs). As a result, the control channel can be detected efficiently.

Please note that, detail of the starting position and the size information is not limited, and ways via which the UE obtains the starting position and the size information are also not limited. For example, the starting index can be included in a higher layer signaling (e.g., radio resource control (RRC) signaling) or a legacy physical downlink control channel (PDCCH) transmitted by the network. That is, the network transmits the higher layer signaling or the legacy PDCCH to the UE, to provide the starting index to the UE. Alternatively, the UE can obtain the starting index according to at least one physical layer parameter (e.g., cell ID, subframe number, etc.). That is, the starting index is a function of the at least one physical layer parameter. On the other hand, the size information can include at least one of a number of total resource blocks and a number of resource blocks for transmitting the control channel. For example, the control channel can be distributed uniformly according to the starting position and the size information, and a spacing of the control channel can be obtained according to the number of total resource blocks and the number of resource blocks.

When the wireless communication system 10 conforms to the 3GPP Rel-11 standard or later versions, the control channel can be an EPDCCH and the control format indicator channel can be an enhanced physical control format indicator channel (EPCFICH) included in at least one of a legacy PDCCH or an EPDCCH transmitted by the network.

Figure 7:
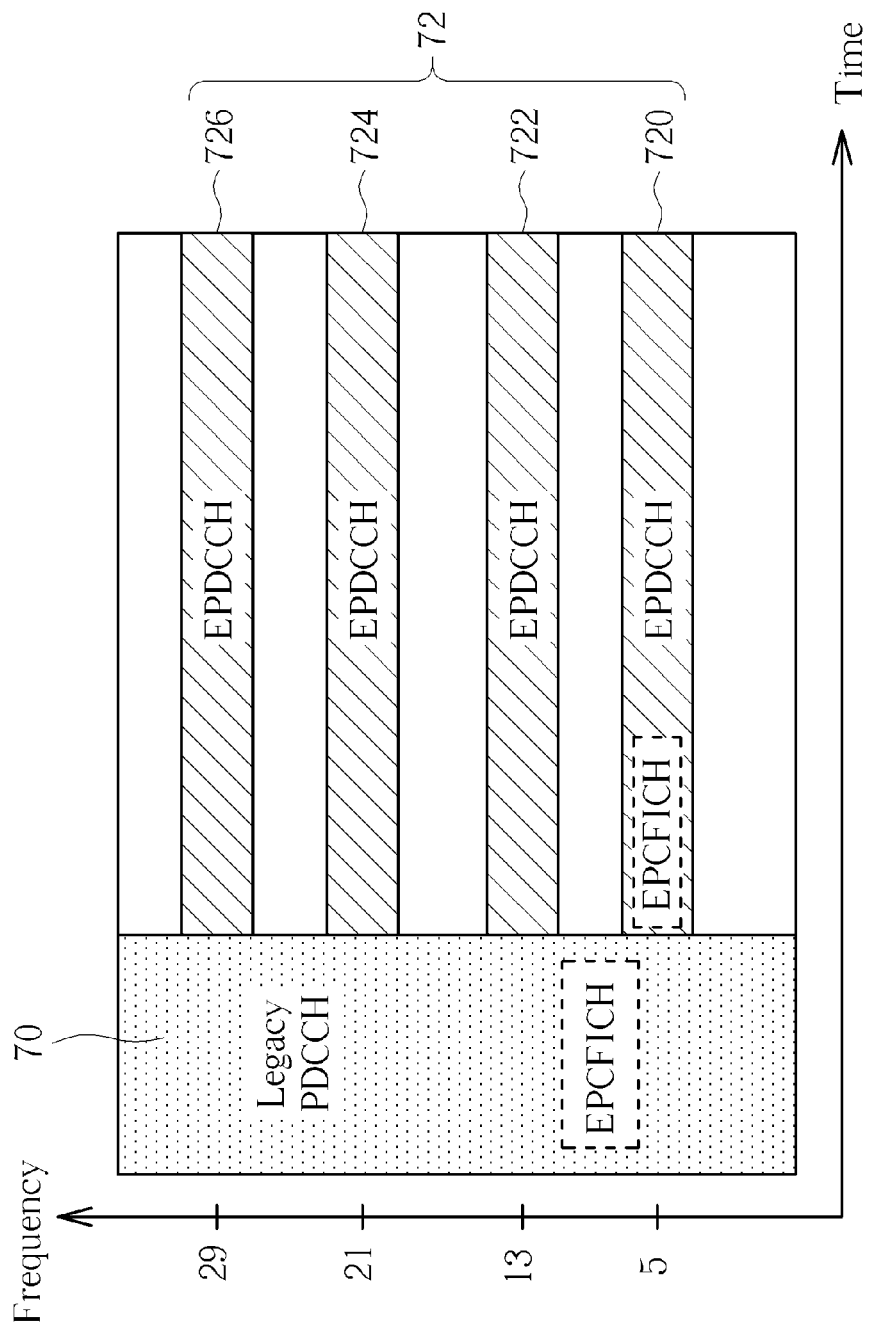
FIG. 7 is a schematic diagram of resource allocation according to an example of the present invention.

Please refer to FIG. 7, which is a schematic diagram of resource allocation according to an example of the present invention. As shown in FIG. 7, a legacy PDCCH 70 is transmitted by the network over an entire (i.e., considered) bandwidth (e.g., which include a large number of RBs), while an EPDCCH 72 is transmitted by the network over a smaller bandwidth including RBs 720-726 which are distributed uniformly. For example, the size information can include that the entire bandwidth of $N_{RB}$=32 RBs and the EPDCCH 72 of $N_{EPDCCH}$=4 RBS (i.e., the RBs 720-726). The starting index is start_ind=5. Then, after obtaining the starting index and the size information, the UE can detect the RBs 720-726 according to the following equation:

$$EPDCCH_n = \text{start\_ind} + \left\lfloor \frac{N_{RB}}{N_{EPDCCH}} \right\rfloor \cdot n, \quad \text{(Eq. 2)}$$

where n=0, . . . , ($N_{EPDCCH}$−1), $\lfloor \cdot \rfloor$ is a floor function, and $EPDCCH_n$ is an index of the nth RB. Thus, $EPDCCH_n$=5, $EPDCCH_1$=13, $EPDCCH_2$=21 and $EPDCCH_3$=29 can be obtained, and the UE can detect the RBs 520-526 accordingly. Besides, as mentioned previously, the EPCFICH which is used for transmitting the size information can be included in the PDCCH 70 and/or the EPDCCH 72 transmitted by the network.

Thus, according to the process 50, the process 60 and the abovementioned description, the starting position can be determined semi-statically for realizing the FDM-ICIC, while the size information can be configured rapidly to adapt to the fast varying environments (e.g., a number of the UEs). As a result, the control channel can be detected with a low overhead and better performance.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the present invention provides a method for handling a control channel. The network can assign the control channel to the UE by using a signaling with low overhead, while the UE can detect and recover the control channel correctly according to the signaling. Besides, tradeoff between the overhead and the performance is solved according to the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of detecting an enhanced physical downlink control channel (EPDCCH), the method comprising:
   determining, by a communication device, a number of a plurality of resource blocks assigned for the EPDCCH according to a size indicator;
   determining, by the communication device, the plurality of resource blocks according to a combinatorial index, wherein the combinatorial index is determined according to the following equation:

$$c_m = \sum_{i=0}^{m-1} \binom{N - r_i}{m - i},$$

where m is the number of the plurality of resource blocks, $r_i$ is an index of an ith resource block of the plurality of resource blocks with $1 \leq r_i \leq N$ and $r_i < r_{i+1}$, N is the number of the total resource blocks, and $$\binom{x}{y} = \begin{cases} \binom{x}{y}, & x \geq y \\ 0 & x < y \end{cases} \text{ with } \binom{x}{y} = \frac{x!}{y!(x-y)!}; \text{ and}$$

detecting the EPDCCH according to the plurality of resource blocks.

2. The method of claim 1, wherein a length of the combinatorial index is $$\left\lceil \log_2 \binom{N}{M} \right\rceil,$$

where M is a maximum number of resource blocks supported, and $\lceil \cdot \rceil$ is a ceiling function.

3. The method of claim 1, wherein the plurality of resource blocks one-to-one correspond to the size indicator and the combinatorial index.

4. A method of indicating an enhanced physical downlink control channel (EPDCCH), the method comprising:
   determining, by a communication device, a size indicator according to a number of a plurality of resource blocks assigned for the EPDCCH;
   determining, by the communication device, a combinatorial index according to the following equation:

$$c_m = \sum_{i=0}^{m-1} \binom{N - r_i}{m - i},$$

where m is the number of the plurality of resource blocks, $r_i$ is an index of an ith resource block of the plurality of resource blocks with $1 \leq r_i \leq N$ and $r_i < r_{i+1}$, N is the number of the total resource blocks, and $$\begin{Bmatrix} x \\ y \end{Bmatrix} = \begin{cases} \begin{pmatrix} x \\ y \end{pmatrix}, & x \geq y \\ 0 & x < y \end{cases} \text{ with } \begin{pmatrix} x \\ y \end{pmatrix} = \frac{x!}{y!(x-y)!} \text{; and}$$

indicating the EPDCCH according to the size indicator and the combinatorial index.

5. The method of claim 4, wherein a length of the combinatorial index is $$\left\lceil \log_2 \begin{pmatrix} N \\ M \end{pmatrix} \right\rceil,$$

where M is a maximum number of resource blocks supported, and $\lceil \cdot \rceil$ is a ceiling function.

6. A communication device for detecting an enhanced physical downlink control channel (EPDCCH), comprising:
a storage unit for storing instructions of:
determining a number of a plurality of resource blocks assigned for the EPDCCH according to a size indicator;
determining the plurality of resource blocks according to a combinatorial index, wherein the combinatorial index is determined according to the following equation:

$$c_m = \sum_{i=0}^{m-1} \begin{Bmatrix} N - r_i \\ m - i \end{Bmatrix},$$

where m is the number of the plurality of resource blocks, $r_i$ is an index of an ith resource block of the plurality of resource blocks with $1 \leq r_i \leq N$ and $r_i < r_{i+1}$, N is the number of the total resource blocks, and $$\begin{Bmatrix} x \\ y \end{Bmatrix} = \begin{cases} \begin{pmatrix} x \\ y \end{pmatrix}, & x \geq y \\ 0 & x < y \end{cases} \text{ with } \begin{pmatrix} x \\ y \end{pmatrix} = \frac{x!}{y!(x-y)!} \text{; and}$$

detecting the EPDCCH according to the plurality of resource blocks; and
a processing means, coupled to the storage unit, configured to execute the instructions stored in the storage unit.

7. The communication device of claim 6, wherein a length of the combinatorial index is $$\left\lceil \log_2 \begin{pmatrix} N \\ M \end{pmatrix} \right\rceil,$$

where M is a maximum number of resource blocks supported, and $\lceil \cdot \rceil$ is a ceiling function.

8. The communication device of claim 6, wherein the plurality of resource blocks one-to-one correspond to the size indicator and the combinatorial index.

9. A communication device for indicating an enhanced physical downlink control channel (EPDCCH), comprising:
a storage unit for storing instructions of:
determining a size indicator according to a number of a plurality of resource blocks assigned for the EPDCCH;
determining a combinatorial index according to the following equation:

$$c_m = \sum_{i=0}^{m-1} \begin{Bmatrix} N - r_i \\ m - i \end{Bmatrix},$$

where m is the number of the plurality of resource blocks, $r_i$ is an index of an ith resource block of the plurality of resource blocks with $1 \leq r_i \leq N$ and $r_i < r_{i+1}$, is the number of the total resource blocks, and $$\begin{Bmatrix} x \\ y \end{Bmatrix} = \begin{cases} \begin{pmatrix} x \\ y \end{pmatrix}, & x \geq y \\ 0 & x < y \end{cases} \text{ with } \begin{pmatrix} x \\ y \end{pmatrix} = \frac{x!}{y!(x-y)!} \text{; and}$$

indicating the EPDCCH according to the size indicator and the combinatorial index; and
a processing means, coupled to the storage unit, configured to execute the instructions stored in the storage unit.

10. The communication device of claim 9, wherein a length of the combinatorial index is $$\left\lceil \log_2 \begin{pmatrix} N \\ M \end{pmatrix} \right\rceil,$$

where M is a maximum number of resource blocks supported, and $\lceil \cdot \rceil$ is a ceiling function.

* * * * *